Jan. 1, 1929.
E. P. HAYES ET AL
1,697,840
LIQUID MEASURE CONTROL
Filed Jan. 26, 1927    4 Sheets-Sheet 1
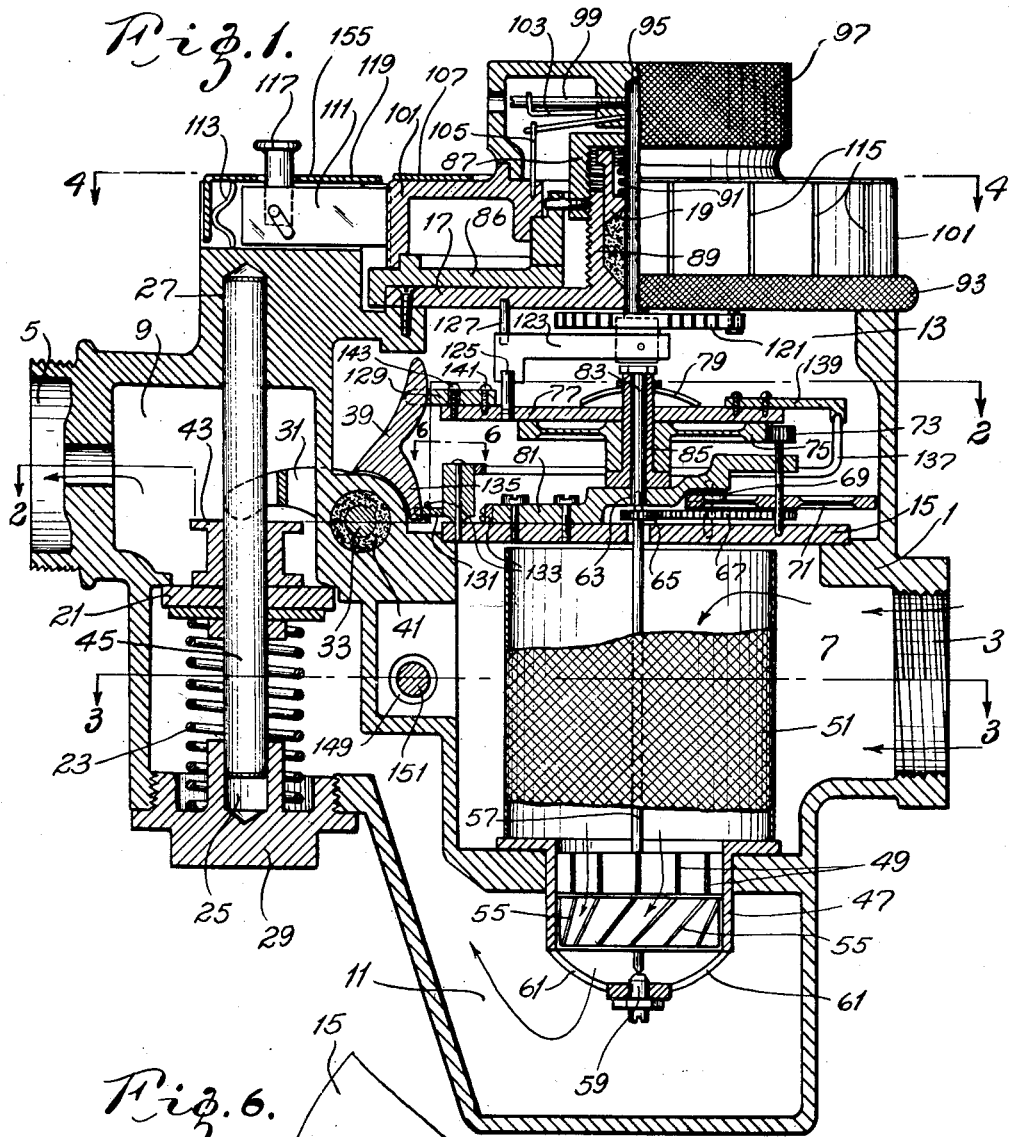
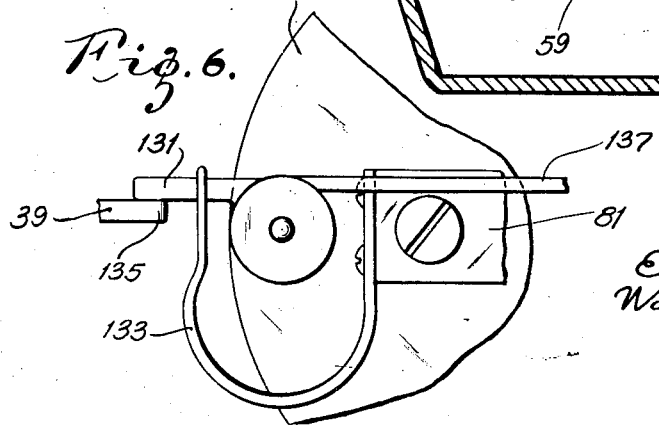

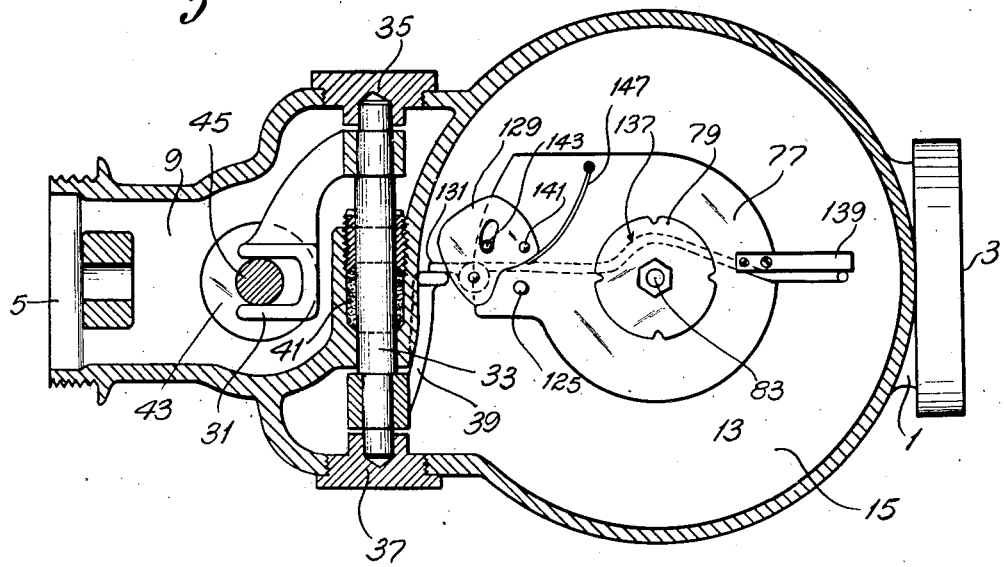
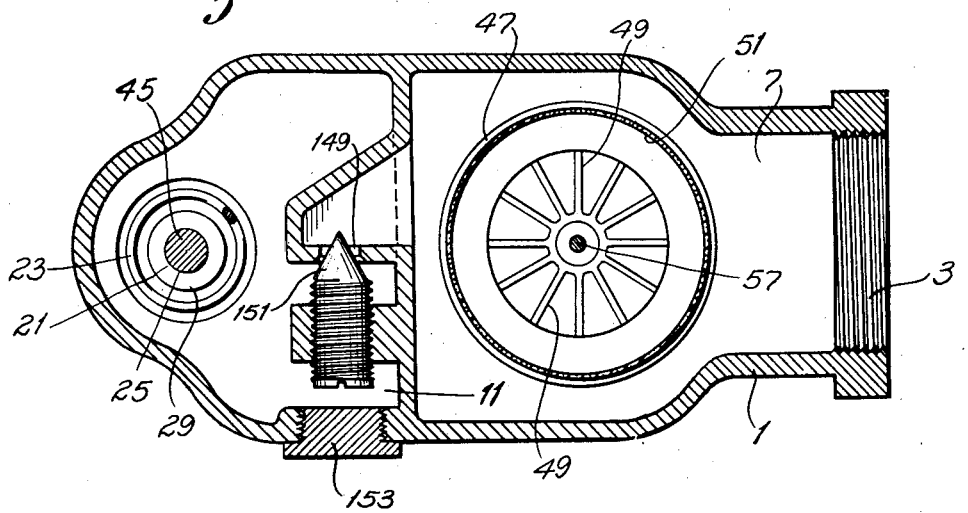

Jan. 1, 1929. 1,697,840
E. P. HAYES ET AL
LIQUID MEASURE CONTROL
Filed Jan. 26, 1927 4 Sheets-Sheet 3

Jan. 1, 1929.
E. P. HAYES ET AL
1,697,840
LIQUID MEASURE CONTROL
Filed Jan. 26, 1927
4 Sheets-Sheet 4
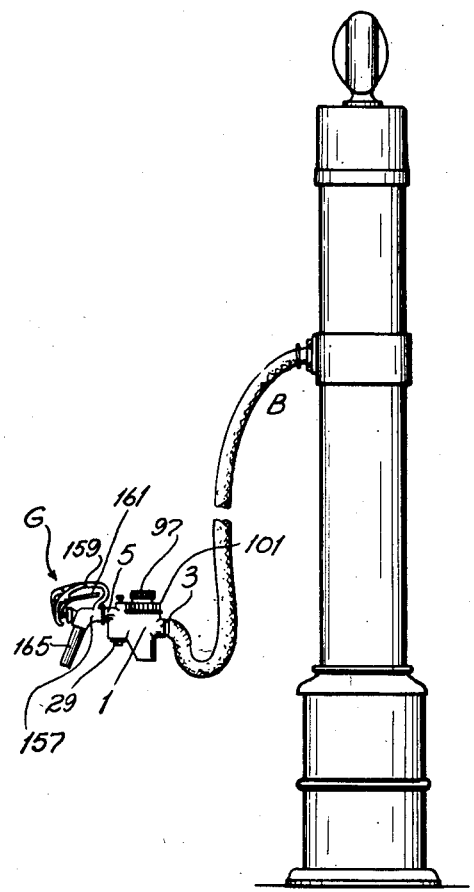
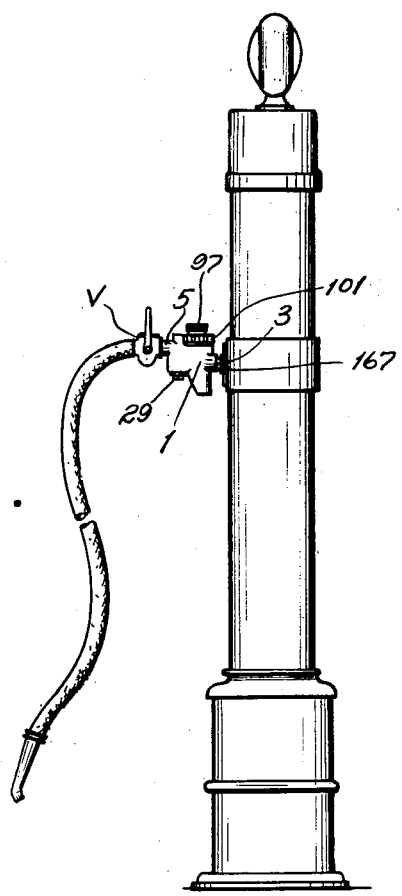
Edmund P. Hayes,
Walter M. Harks,
Inventors,
Delos G. Haynes,
Attorney Patented Jan. 1, 1929.

1,697,840

UNITED STATES PATENT OFFICE.

EDMUND P. HAYES AND WALTER MATHIAS HARKS, OF WICHITA, KANSAS, ASSIGNORS TO THE HAYES EQUIPMENT MANUFACTURING COMPANY, OF WICHITA, KANSAS, A CORPORATION OF KANSAS.

LIQUID-MEASURE CONTROL.

Application filed January 26, 1927. Serial No. 163,630.

This invention relates to liquid measure controls and with regard to certain more specific features, to a control or totalizing meter for measuring liquids, preferably located near the outlet nozzle of a flexible supply line such as is used in dispensing gasoline or the like.

Among the several objects of the invention may be noted the provision of a compact device adapted to be connected into a supply line, said device having dial-setting means therewith, which may be set to a predetermined point and liquid then discharged, the movement of the liquid cutting off its own flow when the desired predetermined amount has passed; the provision of means of the class described which includes a simple correcting device for maintaining accuracy at all times; the provision of the liquid control adapted to be used with a wet or dry delivery hose; and the provision of the device of the class described which is subject to a minimum amount of leakage and derangement. Other objects will be in part obvious and in part pointed out hereinafter.

The invention accordingly comprises the elements and combination of elements, features of construction, and arrangements of parts which will be exemplified in the structure hereinafter described, and the scope of the application of which will be indicated in the following claims.

In the accompanying drawings, in which is illustrated one of various possible embodiments of the invention, Fig. 1 is a vertical section taken longitudinally through the control;

Fig. 2 is a horizontal section taken on line 2—2 of Fig. 1, certain parts being shown in elevation;

Fig. 3 is a horizontal section taken on lines 3—3 of Fig. 1;

Fig. 6 is an enlarged detail taken on line 6—6 of Fig. 1;

Fig. 7 is a small view showing the application of the control to a wet hose construction; and Fig. 8 is a view similar to Fig. 7 showing the application to a dry hose construction.

Corresponding reference characters indicate corresponding parts throughout the several views of the drawings.

Figure 4:
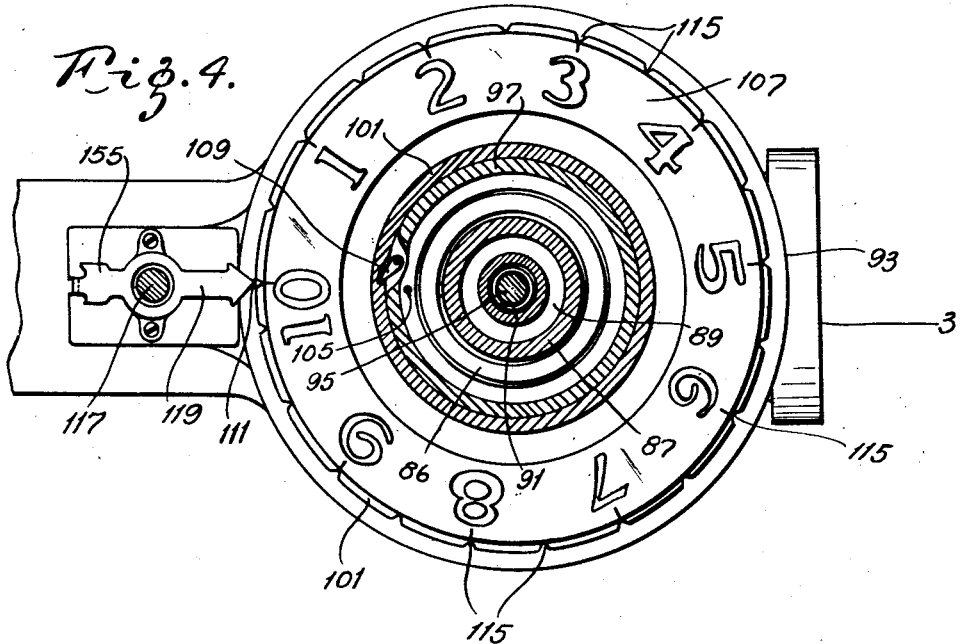
Fig. 4 is a horizontal section taken substantially on line 4—4 of Fig. 1.

Referring now more particularly to Fig. 1, there is illustrated at numeral 1 a liquid-tight body casting or casing having an inlet 3 and an outlet 5. The inlet 3 communicates with an inlet chamber 7 and the oulet 5 communicates with an outlet chamber 9. Between the inlet chamber 7 and the outlet chamber 9 is a communicating chamber or passage 11 through which liquid is adapted to flow (under certain circumstances to be described).

The inlet chamber 7 is separated from a control chamber 13 by means of a suitable plate 15. The separating means is not liquid-tight. The control chamber 13 is closed by means of a plate 17, which includes a central stuffing gland adapted to positively prevent liquid leakage.

In the passage 11 is located a valve 21 which is normally pressed into a closed position by means of a spring 23. The slidable bearings 25, 27 for said valve 21 require no stuffing glands as they entail no openings through the body 1. The bearing 25 is formed as part of a removable cap 29 for assembly purposes. The movement of the valve 21 is controlled from a fork 31 which is made fast to a right-angular rock shaft 33 borne in sideward bearings 35, 37 screwed to the body 1 (see Fig. 2). The rock shaft 33 extends from the outlet chamber 9 (where it supports the fork 31) to the control chamber 13 where it supports an offset lever arm 39. A suitable stuffing gland 41 prevents leakage between the chambers 9 and 13 at the rock shaft 33. It may be seen from Fig. 1 that the fork 31 controls the valve 21 by pressure on a collar 43 made fast to stem 45 of said valve.

Between the inlet chamber 7 and the communicating passage 11 is formed an opening containing a guide bushing 47 having stationary longitudinal guide vanes 49 formed therewith. The bushing 47 carries a stationary strainer screen 51 which is formed as a cylinder extending into and across the inlet chamber 7.

Rotatably mounted in the guide bushing 47, beneath the stationary vanes, is a set of driving or metering vanes 55. These vanes 55 are helically formed with respect to any flow which may take place through the bushing 47. Hence when liquid is projected longitudinally through the vanes 49, then the vanes 55 are driven to rotate as a unit.

The set of driving vanes 55 is made fast to a drive shaft 57, said shaft 57 being mounted longitudinally of the bushing 47 and screen 51. The shaft 57 is supported at one end in a bearing 59, held by arms 61 of the bushing 47, and is supported at its other end in a bearing 63 located in a gudgeon 83 held fast in a support 81. Suitable anti-friction arrangements are used at the bearings 59, 63, such as jeweling or the like.

The drive shaft 57 extends through said plate 15 into the control chamber 13 where it is provided with a pinion 65 adapted to drive a train of reducing gears 67, 69, 71, 73 and 75. The last gear 75 of this train is held in frictional engagement with a movable plate 77. The frictional engagement is accomplished by means of a compression spring 79 reacting downwardly on said plate 77.

From the above it will be seen that rotation of the drive shaft 57 is transmitted to the plate 77. The supporting member 81 and the plate 15 support the various gears of the recited train and said member 81 also supports the gudgeon 83 about which rotates the bushing 85 between the plate 77 and gear 75. The gudgeon 83 is stationary.

Referring now more particularly to the control features in and associated with the control chamber 13, it may be seen that a rotatable member 86 cooperates with the circular enclosing plate 17. This member 86 is pinned to a threaded cap 87 which screws to an extension 89 of said plate 17. The extension 89 contains said stuffing gland 19. A compression spring 91 reacts between the cap 87 and the gland 19. Hence, when the member 86 is adjustably turned by the hand of an operator on the knurled edge 93 thereof, the gland 19 may be adjusted.

Extending through said stuffing gland 19 is a control shaft 95 held to a setting knob 97 by means of an elongated set screw 99. The setting knob 97 rotatably cooperates with a dial carrier 101, relative movement between the knob 97 and the carrier 101 being permitted by an engaging spring 103 cooperating with said set screw 99 and a pin 105 fastened to the dial carrier 101. The dial carrier 101 carries and supports a dial plate 107, shown more particularly in Fig. 4. The dial plate 107, with the carrier 101, is rotated by means of a pawl engagement 109 between the knob 97 and said dial carrier 101 (see Fig. 4). This simultaneous rotation of the knob 97 and the carrier 101 can take place in a counter-clockwise direction only, because of said pawl 109. A detent 111 is normally caused (by a spring 113) to engage suitable detent recesses or V-notches 115 formed in the edge of the dial carrier 101. A button 117, manually operable, is adapted to disengage the detent from the dial carrier notches when necessary. The button 117 is supported in a separate plate 119.

The said control shaft 95 has also a resilient engagement with the stationary plate 17 by means of a conventional spiral spring 121 and carries at its lower end a setting lever 123. The lever 123 is moved by the control shaft 95 and in turn is adapted to move the plate 77 by way of an engaging pin 125. A stop pin 127 for the lever 123 is provided in the plate 17.

At the extremity of the plate 77 (in the region of the lever arm 39) is a pawl 129 adapted to engage said lever arm 39 when the plate 77 receives motion from the control lever 123. It is evident from the above that one of the actions of the setting knob 97 is to open the valve 21, this being done by the lever 123, plate 77, pawl 129, lever 39 and collar 43.

The valve 21 is adapted to be held in an open position by means of a trigger 131. This is because the said trigger 131 is normally pressed by a spring 133 such that it tends to spring under a toe 135 of said lever 39, that is, when the lever 39 is thrown in a position such that the valve 21 is open. The spring 133 is of very light construction.

As illustrated in Fig. 1, the trigger 131 is rotatably supported and is provided with an extension arm 137 adapted to be engaged by a releasing arm 139 fastened to the opposite side of said plate 77.

In Fig. 2 is shown the particular way in which the pawl 129 is mounted so that it will move the lever 39 when the plate 77 rotates in a counter-clockwise direction (Fig. 2) but will not move said lever 39 when the plate 77 rotates in a clockwise direction. This is a simple construction in which the pawl 129 is rotatably supported on a pin 141 and guided by a second pin 143. A leaf spring 147 tends to hold the pawl 129 in such a position that it will engage the lever 39.

Fig. 3 illustrates more particularly a by-pass construction between the inlet chamber 7 and the communicating passage 11. It comprises an opening 149 between said chamber 7 and 11 with which cooperates a conically pointed adjusting screw 151. This screw may be reached for adjustment by removing a plug 153. It is intended that the plug be provided with means for applying the inspector's seal, said inspector being the one who is to set the screw 151.

The operation of the measure control is as follows:

The setting knob 97 is turned in a counter-clockwise direction until a predetermined numeral on the indicator dial 107 corresponds with the indicating arrow 155 (at the button 117), said correspondence depending upon the number of gallons to be dispensed. This indicator dial 107 rotates because of the pawl engagement 109 between the knob 97 and the dial carrier 101. The rotation of the knob 97 in this counter-clockwise direction carries with it the setting lever 123, which in turn moves the plate 77. As the plate 77 receives its motion, the pawl 129 acts upon the lever 39 to throw said lever outwardly.

The motion of the lever 39 is transmitted through the rock shaft 33 and the fork 31 to open the valve 21. The valve 21 is held in open position because, at this juncture, the trigger 131 is spring pressed beneath the toe 135. When the knob 97 is released, after having been set, it returns to its original position immediately, because of the action of the spiral spring 121 connected with the shaft 95 and setting lever 123. The pin 127 stops the action at the proper predetermined time.

Although the knob 97 returns to its original position immediately the dial carrier 101 does not return immediately with the knob 97 but remains in the set position because of the engagement of the detent or dog 111 with the predetermined V-notch 115 in the periphery of the dial carrier 101.

Up to this stage, it is assumed that the valve associated with the outlet 5 (to be described) is closed. Assuming that this valve is now opened, the liquid, such as gasoline, enters the inlet port 3 and flows first through the screen 51 and takes a downward course through the stationary vanes 49 and then through the rotatable, angular vanes 55. The liquid then passes upwardly through the now open valve 21 and thence to the outlet 5. For each gallon of liquid which flows through the device, the vanes 55 are adapted to turn twenty-eight times. This motion is transmitted through the drive shaft 57 and said train of gears 65, 67, 69, 71 and 73 to the gear 75. The gear 75 turns the plate 77.

Assuming that the quantity to be dispensed is three gallons, the knob 97 is turned until the indicator 107 reaches the position indicating three gallons. The plate 77 will then have been turned through an angle of substantially 105°, as in this particular embodiment of the invention the gear ratio is such that each twenty-eight revolutions of the vanes 55 will cause a rotation of the gear 75 through an angle of 35°. The particular divisions stated have been chosen so that the numeral 0 and the numeral 10 may be incorporated into one figure, yet indicate two different amounts on the dial 107 (see Fig. 4). As above described, this movement of the knob 97 opens the valve 21, which valve remains open for the time being. The knob 97 returns to its original position but the plate 77 remains in its 105° position until liquid begins to flow through the passages 7, 11 and 9. As the liquid is permitted to flow the vanes 55 are driven to rotate and the plate 77 is carried in a clockwise direction toward its normal resting position.

At the end of the travel of the plate 77, that is, after the three gallons have been dispensed, the release arm 139 comes in contact with the extension arm 137 of the trigger 131. This contact causes a release of the lever 39, thus permitting the valve to close and the flow of liquid to be cut off.

After the liquid has cut off its own flow, the operator by pressing the button 117, can release the indicator dial 107 to return to its zero position under action of the return spring 103. The device is thereby put into condition for the next setting.

Figure 5:
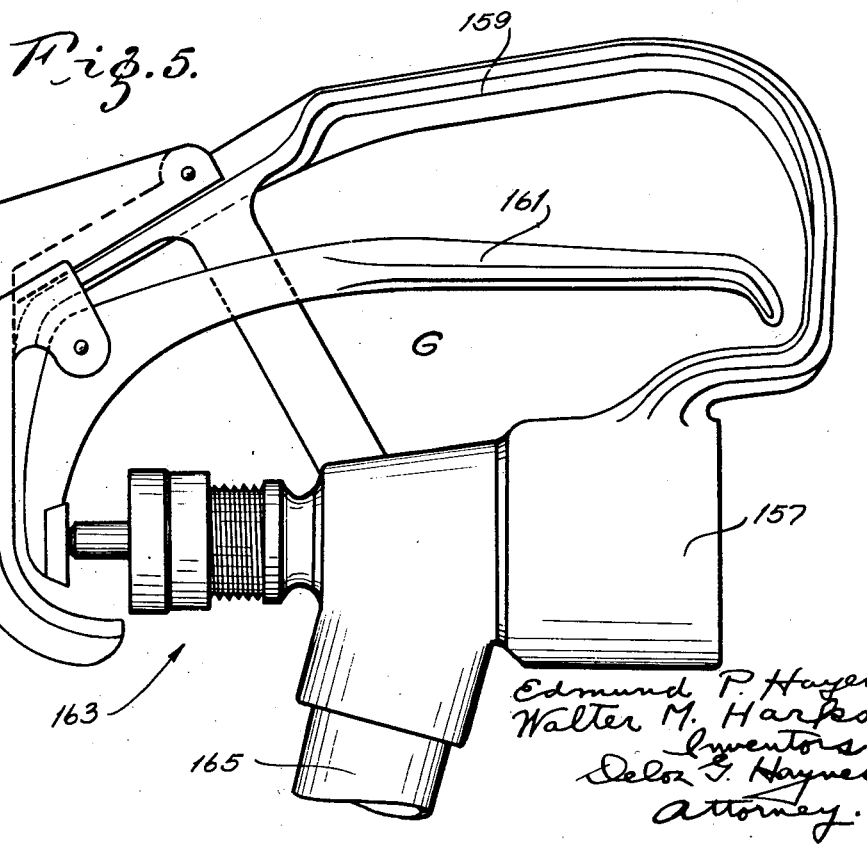
Fig. 5 is a side elevation of a typical valved nozzle adapted to be used with the present control.

The preferred form of outlet valve to be screwed to the outlet passage 5 is indicated in Fig. 5. The portion 157 is screwed to the outlet 5. A suitable handle 159 and trigger grip 161 afford means for opening the conventional valve 163 located within the device. A nozzle 165 is adapted to be placed in the inlet of suitable tanks or the like into which the liquid is being delivered.

Figs. 7 and 8 diagrammatically illustrate the application of the control to wet and dry hose constructions. In Fig. 7 the grip G is fastened directly to the outlet 5 of the control. The inlet 3 of said control is fastened to the outlet end of the hose and the other end of said hose is fastened to a supply bowl B or the like from which liquid is being delivered. In this case, since the liquid is cut off at the outlet side of the control, the hose always carries liquid.

In Fig. 8 is shown a dry hose construction in which the valve V (the equivalent of the valve G) is again screwed to the outlet 5; but in this case the control inlet 3 is screwed directly through the bowl outlet 167. In this case the valve being at the inlet end of the hose cuts off the supply and permits the hose to empty, that is, if the conventional siphon breaker is used.

It is evident that each control manufactured might have different measuring characteristics because of the different frictional effects at the bearings and the like. In order that the vanes 55 may turn exactly twenty-eight times for each gallon transmitted, the by-pass 149 is employed. By this means the device may be calibrated, that is, by setting the screw 151 such that when one gallon is delivered, the twenty-eight turns of the shaft 57 are had. The by-pass serves as means for adjustment to correct for mechanical errors by permitting the by-passing of liquid from the inlet port to the outlet port 9 without flowing through the vanes 55. The variations afforded by the screw 151 permit of readjustments being made from time to time. The device is thereby kept accurate.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. A liquid measure control comprising a body having an inlet chamber, an outlet chamber, a passage joining said chambers having a valve therein, movable vanes in the passage, setting means for causing opening of said valve and permitting a predetermined movement of the movable vanes, means for returning said setting means immediately after movement thereof and means whereby said predetermined movement of the vanes will permit closing of said valve.

2. A liquid measure control comprising a body having an inlet chamber, an outlet chamber, a passage joining said chambers having a valve therein, movable vanes in the passage, setting means for causing opening of said valve and permitting a predetermined movement of the movable vanes, means for returning said setting means immediately after movement thereof, means whereby said predetermined movement of the vanes will permit closing of said valve and indicating means showing the amount of liquid being dispensed.

3. A liquid measure control comprising a body having an inlet chamber, an outlet chamber, a passage joining said chambers having a valve therein, movable vanes in the passage, setting means for opening said valve and permitting a predetermined movement of the movable vanes, means for returning said setting means immediately after movement thereof, means whereby said predetermined movement of the vanes will permit closing of said valve, indicating means showing the amount of liquid being dispensed, and means for manually returning said indicating means.

4. A liquid measure control comprising a body having an inlet chamber, an outlet chamber, a passage joining said chambers having a valve therein, a control chamber in said body, movable members in the passage joining the inlet and outlet chambers adapted to be driven by movement of liquid through the device, a gear train in the control chamber, means for driving said gear train from said movable means, manually controllable setting means, means for opening said valve from the setting means, said setting means permitting a predetermined movement of said gear train, means in the control chamber adapted to permit closing of said valve after said predetermined movement of the gear train and a stuffing gland associated with the valve opening means arranged to prevent escape of fluid from the device but permitting fluid to enter said control chamber.

5. A liquid measure control comprising a body having an inlet chamber, an outlet chamber, a passage joining said chambers having a valve therein, a control chamber in said body, movable members in the passage joining the inlet and outlet chambers, means for driving said members by movement of liquid through the device, a gear train in the control chamber, means for driving said train from said movable means, manually controllable setting means for opening said valve and permitting a predetermined movement of said gear train, means in the control chamber permitting closing of said valve after said predetermined movement of the gear train, a stuffing gland associated with the valve opening means and a stuffing gland between the setting means and said control chamber, and means adjusting said last-named gland from the outside of the body.

In testimony whereof, we have signed our names to this specification this eighth day of January, 1927.

EDMUND P. HAYES.
WALTER MATHIAS HARKS.